US009862240B2

(12) United States Patent
Barrilado

(10) Patent No.: US 9,862,240 B2
(45) Date of Patent: Jan. 9, 2018

(54) DIRECT TIRE PRESSURE MONITORING

(71) Applicant: Andres Barrilado, Toulouse (FR)

(72) Inventor: Andres Barrilado, Toulouse (FR)

(73) Assignee: NXP USA, Inc., Austin, TX (US)

(*) Notice: Subject to any disclaimer, the term of this patent is extended or adjusted under 35 U.S.C. 154(b) by 0 days.

(21) Appl. No.: 15/035,291

(22) PCT Filed: Nov. 22, 2013

(86) PCT No.: PCT/IB2013/002895
§ 371 (c)(1),
(2) Date: May 9, 2016

(87) PCT Pub. No.: WO2015/075494
PCT Pub. Date: May 28, 2015

(65) Prior Publication Data
US 2016/0288594 A1    Oct. 6, 2016

(30) Foreign Application Priority Data

Nov. 22, 2013 (WO) .................. PCT/IB2013/002895

(51) Int. Cl.
*B60C 23/00* (2006.01)
*B60C 23/02* (2006.01)
*B60C 23/04* (2006.01)
*B60C 29/00* (2006.01)

(52) U.S. Cl.
CPC ........ B60C 23/0454 (2013.01); B60C 23/041 (2013.01); B60C 23/0457 (2013.01);
(Continued)

(58) Field of Classification Search
CPC .............. B60C 23/0471; B60C 23/009; B60C 23/0413; B60C 23/0408; B60C 23/0454;
(Continued)

(56) References Cited

U.S. PATENT DOCUMENTS 4,717,905 A * 1/1988 Morrison, Jr. ...... B60C 23/0413
200/61.25
5,525,960 A * 6/1996 McCall ............... B60R 16/0232
116/34 R
(Continued)

FOREIGN PATENT DOCUMENTS

| CN | 102358114 A | 2/2012 |
| CN | 102971160 A | 3/2013 |
| WO | WO-98/06078 | 2/1998 |

OTHER PUBLICATIONS

International Search Report for Application IB2013/002895 (dated Jul. 22, 2014).

*Primary Examiner* — Hoi Lau
(74) *Attorney, Agent, or Firm* — Charlene R. Jacobsen

(57) ABSTRACT

A power efficient direct Tire Pressure Monitoring System, TPMS, for providing a non-continuous tire pressure monitoring of a tire of a vehicle, such as a automobile vehicle, the TPMS comprising:
  a processing unit having at least a first operating mode and a second operating mode;
  a timing unit;
  an acceleration measuring unit;
  a comparing unit;
  a pressure measuring unit;
  a transmitting unit; and,
  a power supplying unit for supplying power to the processing unit in the first and second operating modes wherein the latter mode is less power consuming than the former mode, wherein the processing unit is adapted to:
    enter the second operating mode after an acceleration threshold and an operating clock frequency have been set; and,
    enter the first operating mode responsive to a first trigger signal.
A tire, a vehicle and a method are also claimed.

12 Claims, 3 Drawing Sheets

(52) U.S. Cl.
CPC ...... *B60C 23/0459* (2013.01); *B60C 23/0488* (2013.01); *B60C 23/0496* (2013.01); *B60C 29/005* (2013.01)

(58) Field of Classification Search
CPC ............ B60C 23/0459; B60C 23/0416; B60C 23/0481; B60R 16/0232
USPC .................. 340/442, 447, 444, 438, 426.33; 701/34.4, 33.7; 702/141
See application file for complete search history.

(56) References Cited

U.S. PATENT DOCUMENTS

| | | | |
|---|---|---|---|
| 5,825,286 A * | 10/1998 | Coulthard | ............ B60C 23/009 340/442 |
| 8,126,608 B2 | 2/2012 | Vassilieff | |
| 8,514,062 B2 * | 8/2013 | Patel | ................... B60C 23/0471 340/438 |
| 2006/0028326 A1 * | 2/2006 | Haas | ................... B60C 23/0408 340/426.33 |
| 2007/0089525 A1 * | 4/2007 | Momose | ............... G01L 9/0025 73/753 |
| 2008/0243327 A1 * | 10/2008 | Bujak | ................ B60C 23/0481 701/33.7 |
| 2009/0204361 A1 * | 8/2009 | Watasue | ............ B60C 23/0408 702/141 |
| 2012/0319832 A1 * | 12/2012 | Vassilieff | ............ B60C 23/0408 340/447 |
| 2013/0166140 A1 * | 6/2013 | Steiner | ................ B60C 23/0459 701/34.4 |
| 2014/0195107 A1 * | 7/2014 | Park, II | ............... B60C 23/0416 701/34.4 |
| 2016/0288594 A1 * | 10/2016 | Barrilado | ............ B60C 23/0454 |

* cited by examiner

PRIOR ART

DIRECT TIRE PRESSURE MONITORING

FIELD OF THE INVENTION

This invention relates to a Tire Pressure Monitoring Systems (TPMS), a tire, a vehicle and a method of operating a TPMS.

BACKGROUND OF THE INVENTION

Driving a vehicle with correctly inflated tires can notably reduce fuel consumption and road safety risks. Indeed, under-inflated tires are more prone to stress damage, have less lateral traction, have a shorter tread life and are more vulnerable to flat fires and blow outs. Furthermore, under-inflated tires can increase the distance required for a vehicle to stop, especially if the surface is wet. In order to tackle this problem, several governments throughout the world have adopted mandatory standards for installing Tire Pressure Monitoring Systems (TPMS) in vehicles. In fact with a TPMS, the driver of a vehicle is notified when a tire is significantly under-inflated. TPMS are also essential to warn the driver in case of air pressure loss of so-called runflat tires, which are designed to be safely driven while uninflated or underinflated due to a puncture or the like. A direct TPMS is configured to measure the air pressure directly inside the tire. For this, the TPMS needs to be located in the tire, usually attached to the inflation valve of the tire. The TPMS then transmits a signal proportional to the pressure measurement e.g. via RF to a central receiver which is usually mounted under the dashboard of the vehicle. Finally, the central receiver in operation will receive the signal, decode it, analyse it and send the pressure information to the display (e.g. LCD display) viewable by the driver of the vehicle.

In certain implementations of direct TPMS, the link that exists between the TPMS and the central receiver is solely unidirectional. This may be problematic since foregoing TPMS standards prescribe that pressure information from a tire must be measured while the vehicle is in motion. Hence, in case of a unidirectional link, the TPMS cannot be informed about the vehicle being in motion for example by the central receiver. Consequently in such case, the TPMS has to determine by itself that the vehicle is in motion. This is why direct TPMS usually comprise an accelerator sensor in addition to the pressure sensor. In this configuration a TPMS developer, in addition to the program code needed to determine the tire pressure, must write a program code to determine motion by verifying the state of the accelerator sensor at different points in time. TPMS program code development is quite challenging due to the fact that every TPMS operation, such as tire pressure or acceleration determination, must have the lowest power consumption possible since direct TPMS have their own independent power source (e.g. a battery) that cannot be changed once the TPMS is installed in the tire. Therefore, in order to fulfill lifetime requirements, power-hungry operations of the TPMS need to be reduced when possible.

SUMMARY OF THE INVENTION

The present invention provides a Tire Pressure Monitoring Systems (TPMS), a tire for an automobile vehicle, a vehicle and a method of providing a non-continuous tire pressure monitoring of a tire of a vehicle, such as an automobile vehicle, as described in the accompanying claims. Specific embodiments of the invention are set forth in the dependent claims. These and other aspects of the invention will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the proposed solution may for the most part, be composed of electronic components and circuits known to those skilled in the art, details will not be explained in any greater extent than that considered necessary for the understanding and appreciation of the underlying concepts of the subject application, in order not to obfuscate or distract from the teachings of the subject application.

Figure 1:
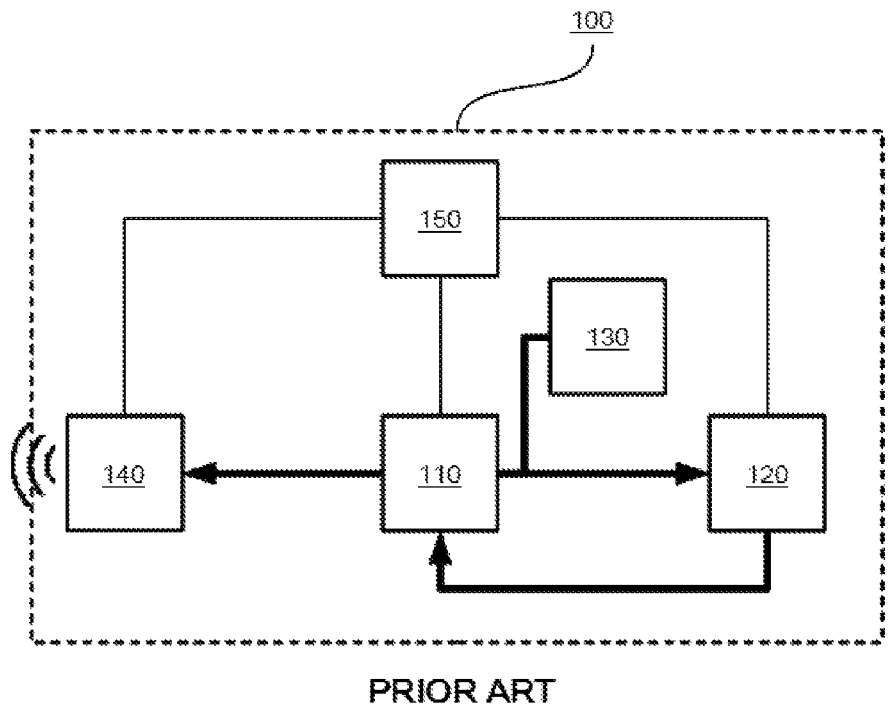
FIG. 1 is a schematic diagram of a prior art Tire Pressure Monitoring System (TPMS).

Referring to FIG. 1, there is diagrammatically shown therein a prior art Tire Pressure Monitoring System (TPMS) 100 comprising:

- a processing unit 110 having a first operating mode and a second operating mode;
- an acceleration measuring unit 120 coupled to the processing unit 110;
- a pressure measuring unit 130 coupled to the processing unit;
- a transmitting unit 140 coupled to the processing unit; and,
- a power supplying unit 150 for supplying power to the processing unit 110, acceleration measuring unit 120, pressure measuring unit 130 and transmitting unit 140.

Figure 2:
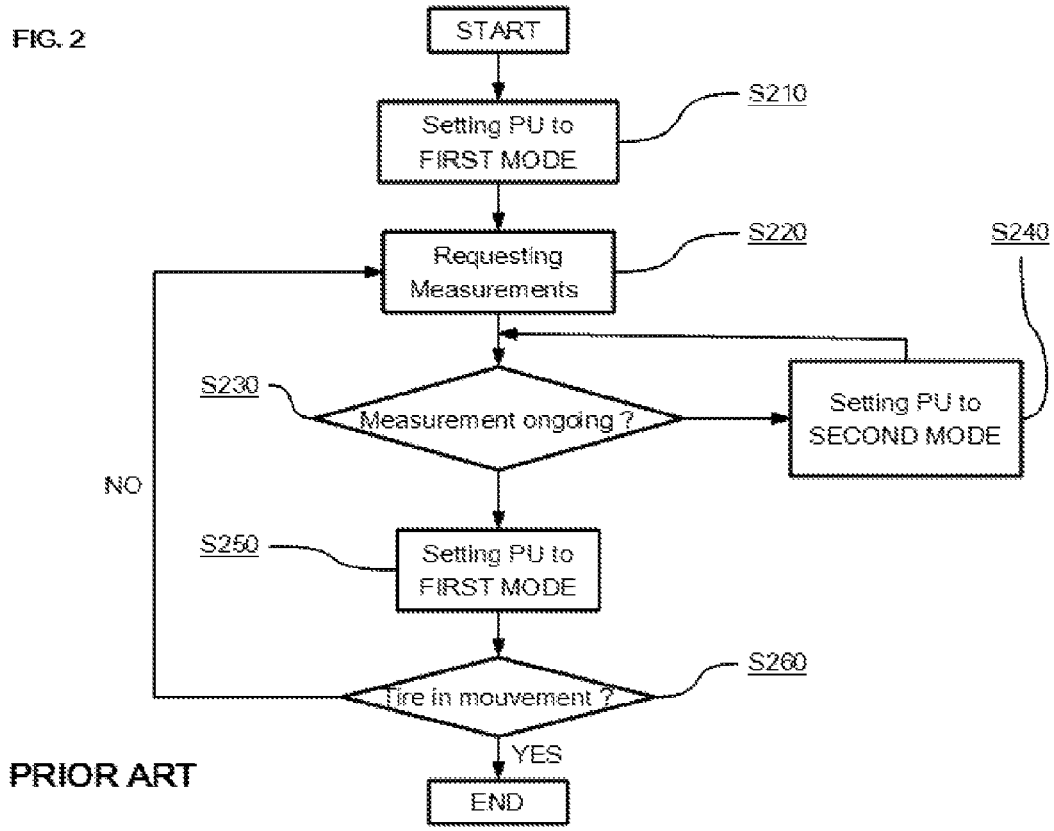
FIG. 2 is a schematic flow diagram of a prior art process of operating a processing unit of the TPMS of FIG. 1.

The TPMS 100 of the prior art, and more specifically the processing unit 110, works as illustrated in the process of FIG. 2. Specifically, in step S210 the processing unit 110 enters the first operating mode in which maximum power consumption of the processing unit 110 is experienced. Such high power consumption is experienced since execution a program code by the processing unit 110 can only be performed while operating in the first operating mode. In step S220, a program code is executed by the processing unit 110 and tire acceleration measurement is requested to the acceleration measuring unit 120. In step S230, while tire acceleration measurement is ongoing the processing unit 110 leaves the first operating mode and enters the second operating mode (step S240) in which no program code can be executed by the processing unit 110 and where power consumption is reduced compared to the first operating mode. Later, in step S250, when acceleration measurements are completed, there are provided to the processing unit 110 and the processing unit 110 leaves the second operating mode to enter the first operating mode. After entering the first operating mode, the processing unit 110 executes a program code to determine tire movement based on the acceleration measurements (step S260). Further, once tire movement has been positively confirmed a program code is executed by the processing unit 110 to request tire pressure measurement to the pressure measuring unit 130. However, when tire movement is not positively confirmed (i.e. the vehicle is not moving), the whole process from step S220 to step S260 starts all over again until tire movement is confirmed. Finally, once tire pressure measurement has been obtained the corresponding information is sent to a central receiver through the transmitting unit 140.

As can be seen, the processing unit 110 has to be periodically woken-up in order to execute a program code that verifies tire movement (i.e. step S220 to step S260). This typically means that, periodically, a current peak will be observed in the TPMS 100 while the processing unit 110 requests series of acceleration measurements and then performs tire movement determination. The foregoing current peaks will be observed continuously until tire movement is positively assessed by the program code. Another drawback of prior art implementation is the usage of embedded memory space (e.g. RAM memory, Flash memory) in the processing unit 110, which is extremely limited, and which is used to store the program code to be executed.

Therefore, it is an object of the subject application to provide a TPMS 300 that performs a periodic motion-detection determination of a tire with reduced power consumption and reduced program code footprint in the processing unit 310. According to the subject application, this can be achieved by limiting the repetitive need to wake-up the processing unit 310. Namely, most of the repetitive tasks performed by the processing unit 310 by software to determine tire movement may be performed by hardware without the need of often powering up the processing unit 310.

Figure 3:
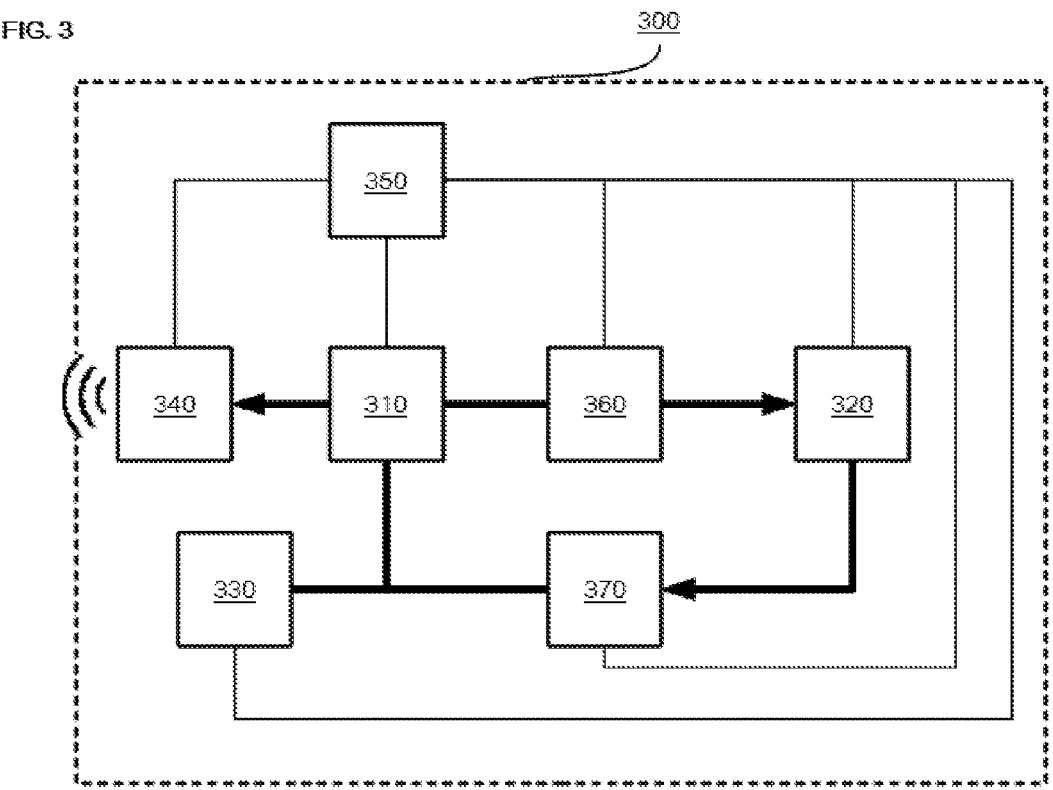
FIGS. 3-3A are schematic diagrams of a TPMS according to embodiments of the subject application.

Referring to FIG. 3, there is diagrammatically shown therein a Tire Pressure Monitoring System (TPMS) 300 according to an embodiment of the subject application. The TPMS 300 is adapted to provide a non-continuous tire pressure monitoring of a tire of a vehicle, such a automobile vehicle or a motorbike vehicle. The wording 'non-continuous' used in the subject application serves distinguishing the TPMS 300 of the subject application with other TPMS which provide 'continuous' monitoring with the vehicle stopped and the ignition switch on. With the proposed TPMS 300 monitoring will only start when the vehicle is considered to be in motion. Thus the term 'non-continuous'. For instance, certain non-continuous TPMS will not monitor tire pressure until the vehicle is moving above a specific speed such as 40 km/h. In the example of FIG. 3, the TPMS 300 as shown comprises:

a processing unit such as a Micro-Controller Unit (MCU) 310 or a processor;
a timing unit such as a timer 360;
an acceleration measuring unit 320;
a comparing unit such as a value comparator 370 or a signal comparator;
a pressure measuring unit 330;
a transmitting unit such as a radio frequency (RF) transmitter 340;
a power supplying unit such as a battery 350 for supplying power to the processing unit 310, timing unit 360, acceleration measuring unit 320, comparing unit 370, pressure measuring unit 330 and transmitting unit 340.

In examples of embodiments, the timing unit 360, the acceleration measuring unit 320, the comparing unit 370, the pressure measuring unit 330 and the transmitting unit 340 may be implemented as hardware, for instance. In other examples of embodiments, the processing unit 110 may be implemented as hardware, software or any combination thereof, for instance.

Referring to the example of FIG. 3 as shown:
the timing unit 360 is operably coupled to the processing unit 110;
the acceleration measuring unit 320 is operably coupled to the timing unit 360;
the comparing unit 370 is operably coupled to the processing unit 310 and the acceleration measuring unit 320;
the pressure measuring unit 330 is operably coupled to the processing unit 310; and,
the transmitting unit 340 is operably coupled to the processing unit 310.

In an embodiment, the processing unit 310 has at least a first operating mode and a second operating mode. However, it may also be contemplated to have more than two operating modes of the processing unit 310. For instance three operating modes may be used such as a full-power operating mode, a medium-power operating mode and a power-saving operating mode. In the example of FIG. 3, the first operating mode the processing unit 310 is experiencing maximum power consumption since it is only within the framework of this mode that the execution of a program code by the processing unit 310 can only be performed. On the other hand, in the second power consumption is reduced compared to power consumption in the first operating mode and no program code can be executed by the processing unit 310. Therefore, one should understand that the second operating mode is less power consuming than the first operating mode. In FIG. 3, when operating in the first operating mode, the processing unit 310 is adapted to set initialisation parameters of the TPMS 300. For instance, the processing unit may set an operating clock frequency of the timing unit 360. In an example, the processing unit 310 may set the timing unit 360 to operate at the frequency of 0.1 Hz such that the timing unit 360 is adapted to perform a given operation every 10 seconds (i.e., 1/0.1 Hz). In fact, the timing unit 360 of FIG. 3 is adapted to activate the acceleration measuring unit 320 at the rate of the operating clock frequency. The acceleration measuring unit is adapted to measure at least one acceleration value associated with the tire in at least one direction. Therefore, based on the foregoing example, at least one acceleration measurement may be performed by the acceleration measuring unit 320 every 10 seconds. One advantage of the subject application is the fact that after setting up the operating clock frequency of the timing unit 360, the processing unit 310 is adapted to leave the first operating mode and to enter the second operating mode. Therefore, with respect to the foregoing example and contrary to the prior art teachings, the processing unit 310 will not be waken-up every 10 seconds to request acceleration measurements to the acceleration measuring unit 320. Indeed, in the proposed solution it is the timing unit 360 which is responsible for periodically triggering the activation of the acceleration measuring unit 320 based on the operating clock frequency defined by the processing unit 310 while being in the first operating mode. Consequently, with the proposed solution, the processing unit 310 will stay longer in second operating mode in comparison with the prior art of FIGS. 1 and 2. Thus power consumption of the TPMS 300 will be reduced. Indeed, as will be seen later on, the processing unit of the subject application enters the second operating mode only once during the process of tire motion determination.

Referring again to FIG. 3, when operating in the first operating mode, the processing unit 310 is further adapted to set an acceleration threshold of the comparing unit 370. An advantage of the subject application is the fact that after setting up the acceleration threshold of the comparing unit 370, the processing unit 310 is adapted to leave the first operating mode and to enter the second operating mode. This will bring the same power consumption reduction as already explained above. The comparing unit 370 is adapted to compare the acceleration value and the acceleration threshold and to generate a first trigger signal when the absolute acceleration value is greater than the acceleration threshold and to direct the first trigger signal to the processing unit 310. For example, if the processing unit 310 set the acceleration threshold to 30 km/h and the acceleration measuring unit 320 has measured an acceleration of 25 km/h, then the first trigger signal will not be generated. In another example, if the processing unit 310 set the acceleration threshold to 30 km/h and the acceleration measuring unit 320 has measured an acceleration of 40 km/h, then the first trigger signal will be generated. Of course, in another embodiment, the acceleration value may be compared to more than one acceleration threshold. For example, two acceleration thresholds may be use, namely one for assessing a positive acceleration and one for assessing a negative acceleration. Another advantage of the subject application is the fact that after receiving the first trigger signal the processing unit 310 is adapted to leave the second operating mode and to enter the first operating mode. Therefore as indicated above, the whole process of determining tire motion is performed without having to wake-up the processing unit 310 i.e., to leave the second operating mode and unduly consume power of the power supplying unit 350 for determining tire motion. Indeed, when the vehicle is parked, the processing unit 310 is only woken-up once only, when a predefined criterion has been satisfied, i.e. tire motion has been positively assessed. Later on, once tire motion has been positively assessed the processing unit 310 is further adapted to activate the pressure measuring unit 330 responsive to the first trigger signal. The pressure measuring unit 330 is adapted to measure at least one air pressure value associated with the tire. Furthermore, when operating in the first operating mode, the processing unit is further configured to generate a transmitting signal based on the measured air pressure value. Finally, the transmitting unit 340 is adapted to transmit the transmitting signal, for example to a central receiver of the vehicle.

Figure 3A:
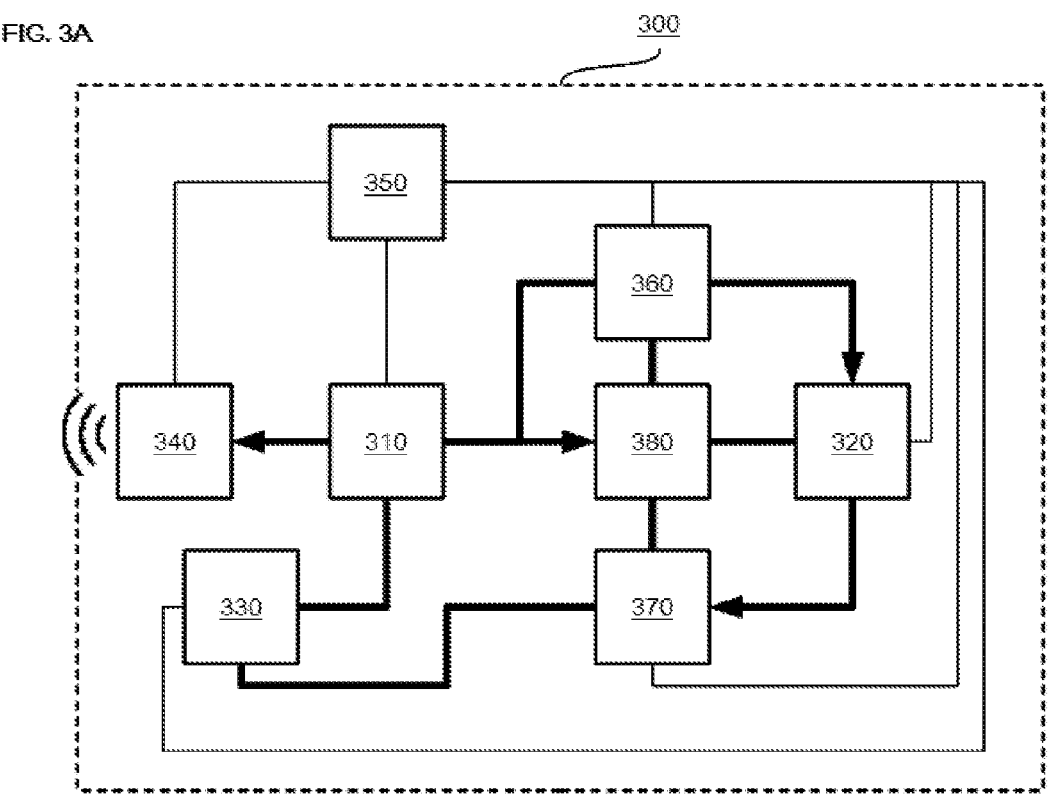

Referring now to FIG. 3A, the TPMS 300 further comprise a memory unit such as a register 380 or a cache memory. The memory 380 unit as shown is operably coupled to the processing unit 310, the timing unit 360 and the comparing unit 370. In such configuration the processing unit 310 may store the operating clock frequency of the timing unit 360 and the acceleration threshold of the comparing unit 370 in the memory unit 380. Consequently, the timing unit 360 may be further adapted to retrieve the stored operating clock frequency from the memory unit 380 and the comparing unit 370 may be further adapted to retrieve the stored acceleration threshold from the memory unit 380. In one embodiment, the memory unit 380 may be further operably coupled to the acceleration measuring unit 320. This way, acceleration measurement information of the acceleration measuring unit may be stored in the memory unit 380 which may be further retrieved by acceleration measuring unit 320 while being in operation. For example, filter characteristics of the acceleration unit 320 applied on sensed acceleration values may be comprised in the acceleration measurement information. Also, the number of acceleration measurements to be performed may be included as well in the acceleration measurement information.

In example of embodiments, the pressure measuring unit 330 may be further operably coupled to the comparing unit 370. In such configuration, the comparing unit 370 is further adapted to generate a second trigger signal when the absolute acceleration value is greater than the acceleration threshold and to direct the second trigger signal to the pressure measuring unit 330. Later, the pressure measuring unit 330 may be further adapted to:
  be activated responsive to the second trigger signal; and,
  generate a third trigger signal when the pressure measurement has been completed and to direct the third trigger signal to the processing unit 310.

It results from this configuration that the comparing unit 370 no longer needs to transmit the first trigger signal to the processing unit 310 such that the comparing unit 370 is no longer in need to be operably coupled to the processing unit 310. Also, it is to be pointed out that in such configuration, the processing unit 310 may be further adapted to leave the second operating mode and enter the first mode responsive to the third trigger signal. Such configuration would improve even further the overall consumption of the processing unit 310. In fact, in this embodiment the pressure measurement unit 330 is automatically triggered by the comparing unit 370 once tire motion has been positively assessed such that the processing unit 310 is no longer in need to execute a program code to request pressure measurements.

In another example of embodiments, the processing unit 310 may be further adapted to set a wake-up frequency of the timing unit 360. For example, the wake-up frequency may be set directly to the timing unit 360 as illustrated in FIG. 3 or may be stored in the memory unit 380 as illustrated in FIG. 3A. In such embodiment, the timing unit 360 may be further adapted to generate a fourth trigger signal to the processing unit 310 at the rate of the wake-up frequency and to direct the fourth trigger signal to the processing unit 310. The fourth signal may be used to wake-up the processing unit 310. This may be useful in order to verify whether problem is experienced in the blocks responsible for determining tire motion (e.g. the acceleration measuring unit 320 and the comparing unit 370). In fact, in the subject application all repetitive tasks related to tire motion determination are performed by hardware blocks that may malfunction. It is an object of the wake-up frequency to wake up the processing unit 310 at appropriate moments such that the processing unit 310 can verify if the above mentioned blocks are working properly where for instance no first or third trigger signal has been received by the processing unit 310 during a given period. For example, once the processing unit 310 is woken-up by the timing unit 360, the processing unit 310 may execute a diagnosis program code to determine whether e.g. the acceleration measuring unit 320 and/or the comparing unit 370 are working properly. Further, in such embodiment, the processing unit 310 may be adapted to:
  leave the first operating mode and enter the second operating mode when the wake-up frequency has been set; and,
  leave the second operating mode and enter the first operating mode responsive to the fourth trigger signal.

A tire for an vehicle such as an automobile or a motorbike vehicle comprising a rim having valve stem and the TPMS 300 of the subject application is also claimed. In such tire, the TPMS 300 is mounted on top of the valve stem. In other configurations, the TPMS 300 may be strapped in the dropwell of the rim. In such case, the TPMS 300 may be mounted on the rim directly opposite to the valve stem. In other embodiments, the TPMS 300 may be placed inside the tire, at the thread, fastened by means of some kind of chemical adhesive (e.g., glue). In another embodiment, the TPMS 300 may be embedded between the thread, well inside the tire.

An automobile vehicle, having at least one tire comprising a rim having valve stem and the TPMS 300 of the subject application is also claimed.

Figure 4:
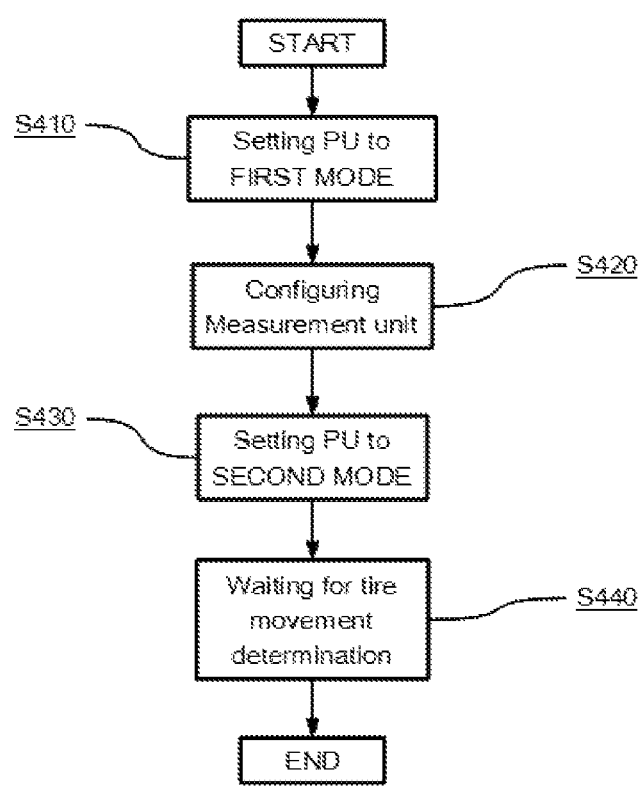
FIG. 4 is a schematic flow diagram of a method of operating a processing unit of a TPMS according to an embodiment of the subject application.

Referring now to FIG. 4, there is diagrammatically shown therein a schematic flow diagram of a method of operating a processing unit 310 of a TPMS 300 according to an embodiment of the subject application.

In S410 the processing unit 310 enters the first operating mode in which maximum power consumption of the processing unit 310 is experienced. Such high power consumption is experienced since execution a program code by the processing unit 310 can only be performed while operating in the first operating mode. In S420, a program code is executed to set an operating clock frequency of the timing unit 360 and an acceleration threshold of the comparing unit 370. As explained above, the setting can be done directly to the timing unit 360 and the comparing unit 370 or can be stored in the memory unit 380 for future access. Later in S430, the processing unit 310 leaves the first operating mode and enters the second operating mode in which no program code can be executed by the processing unit 310. In S440, the processing unit 310 is waiting tire movement detection effected by the hardware. Later on, the processing unit 310 may be woken-up by the reception of the first trigger signal or by the reception of the third trigger signal, for instance. In case of reception of the first trigger signal, the processing unit 310 may execute a program code to request tire pressure measurement to the pressure measuring unit 330. Finally, once tire pressure measurement has been obtained the corresponding information is sent to central receiver through the transmitting unit 340.

The skilled person would appreciate that the proposed solution provides a power efficient non-continuous tire pressure monitoring of a tire of a vehicle, such as a automobile vehicle or a motorbike vehicle. This solution is achieved by moving the repetitive operations directed to the determination of tire motion out of the responsibility of the processing unit 310. Namely, such operations are proposed to be performed by hardware blocks that consume little power. This way, the consumption of the processing unit 310 which is most important in the field of TPMS is drastically reduced and the processing unit 310 may be used at other tasks thus maximising the efficiency of the TPMS 300. Therefore overall power consumption of the TMPS 300 is reduced since the processing unit 310 is slightly used during tire motion determination. The proposed solution may also require less program coding since most of the components used to determine tire motion are implemented in hardware where little or no program is needed. In this thus no longer necessary to write a specific code at the processing unit 310 level to determine tire motion in non-continuous tire pressure monitoring. Also, one should note that the proposed solution is as flexible as the all-software solution of the prior art. Indeed, it is still possible with the proposed solution to change the behaviour or of the TPMS 300 for example by setting different values of the operating frequency, the acceleration threshold and the acceleration measurement information. This way the proposed TPMS may be adapted to the need of specific consumers.

Of course, the above advantages are exemplary, and these or other advantages may be achieved by the proposed solution. Further, the skilled person will appreciate that not all advantages stated above are necessarily achieved by embodiments described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

Also for example, the examples, or portions thereof, may be implemented as soft or code representations of physical circuitry or of logical representations convertible into physical circuitry, such as in a hardware description language of any appropriate type.

Also, the proposed solution is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or operations then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A direct Tire Pressure Monitoring System, TPMS, for providing non-continuous tire pressure monitoring of a tire of a vehicle, the TPMS comprising:
   a processing unit having at least a first operating mode and a second operating mode;
   a timing unit operably coupled to the processing unit;
   an acceleration measuring unit operably coupled to the timing unit;
   a comparing unit operably coupled to the processing unit and the acceleration measuring unit;
   a pressure measuring unit operably coupled to the processing unit;
   a transmitting unit operably coupled to the processing unit; and,
   a power supplying unit for supplying power to at least the processing unit in the first operating mode and in the second operating mode wherein the second operating mode is less power consuming than the first operating mode, wherein:
   when operating in the first operating mode, the processing unit is adapted to set;
      an operating clock frequency of the timing unit; and,
      an acceleration threshold of the comparing unit;
   the timing unit is adapted to activate the acceleration measuring unit at the rate of the operating clock frequency;
   the acceleration measuring unit is adapted to measure an acceleration value associated with the tire in at least one direction;
   the comparing unit is adapted to compare the acceleration value and the acceleration threshold and to generate a first trigger signal when the acceleration value is greater than the acceleration threshold, and to direct the first trigger signal to the processing unit;
   when operating in the first operating mode, the processing unit is further adapted to activate the pressure measuring unit responsive to the first trigger signal;
   the pressure measuring unit is adapted to measure a pressure value associated with the tire;
   when operating in the first operating mode, the processing unit is further configured to generate a transmitting signal based on the pressure value;
   the transmitting unit is adapted to transmit the transmitting signal;
   and, wherein:
   the processing unit is adapted to:
      enter the second operating mode, once, after the acceleration threshold and the operating clock frequency have been set; and,
      enter the first operating mode, once, responsive to the first trigger signal.

2. The TPMS of claim 1 further comprising a memory unit operably coupled to the processing unit, the timing unit and the comparing unit wherein:
   the operating clock frequency of the timing unit is stored in the memory unit; and
   the acceleration threshold of the comparing unit is stored in the memory unit.

3. The TPMS of claim 2 wherein the memory unit is further operably coupled to the acceleration measuring unit wherein acceleration measurement information of the acceleration measuring unit is stored in the memory unit.

4. The TPMS of claim 1 wherein the pressure measuring unit is further operably coupled to the comparing unit; wherein:
   the comparing unit is further adapted to generate a second trigger signal when the acceleration value is greater than the acceleration threshold and to direct the second trigger signal to the pressure measuring unit;
   the pressure measuring unit is further adapted to:
      be activated responsive to the second trigger signal; and,
      generate a third trigger signal when the pressure measurement has been completed and to direct the third trigger signal to the processing unit;
   and, wherein:
   in response to the third trigger signal being directed to the processing unit, the comparing unit no longer transmits the first trigger signal; and,
   the processing unit is further adapted to enter the first mode responsive to the third trigger signal.

5. The TPMS of claim 1, wherein the processing unit is further adapted to set a wake-up frequency of the timing unit, the timing unit being further adapted to send a fourth trigger signal to the processing unit at the rate of the wake-up frequency, and wherein:
   the processing unit is adapted to:
      enter the second operating mode when the wake-up frequency has been set; and,
      enter the first operating mode responsive to the fourth trigger signal.

6. A tire for a vehicle comprising a rim having valve stem and the TPMS of claim 1 wherein the TPMS is mounted on top of the valve stem.

7. A vehicle comprising at least one tire of claim 6.

8. A method for providing a power efficient non-continuous tire pressure monitoring of a tire of a vehicle, the method comprising:
   providing a processing unit having at least a first operating mode and a second operating mode;
   providing a timing unit operably coupled to the processing unit;
   providing an acceleration measuring unit operably coupled to the timing unit;
   providing a comparing unit operably coupled to the processing unit and the acceleration measuring unit;
   providing a pressure measuring unit operably coupled to the processing unit;
   providing a transmitting unit operably coupled to the processing unit; and;
   providing a power supplying unit for supplying power to at least the processing unit in the first operating mode and in the second operating mode wherein the second operating mode is less power consuming than the first operating mode, wherein:
   when the processing unit is operating in the first operating mode, causing the processing unit to set:
      an operating clock frequency of the timing unit;
      an acceleration threshold of the comparing unit;
   causing the timing unit to activate the acceleration measuring unit at the rate of the operating clock frequency;
   causing the acceleration measuring unit to measure an acceleration value associated with the tire in at least one direction;
   causing the comparing unit to compare the acceleration value and the acceleration threshold and to further generate a first trigger signal when the acceleration value is greater than the acceleration threshold, and to direct the first trigger signal to the processing unit;

when the processing unit is operating in the first operating mode, causing the processing unit to activate the pressure measuring unit responsive to the first trigger signal;

causing the pressure measuring unit to measure a pressure value associated with the tire;

when the processing unit is operating in the first operating mode, causing the processing unit to generate a transmitting signal based on the pressure value;

causing the transmitting unit to transmit the transmitting signal;

and, wherein:

the processing unit is caused to:

enter the second operating mode, once, after the acceleration threshold and the operating clock frequency have been set; and, enter the first operating mode, once, responsive to the first trigger signal.

9. The method of claim 8 further comprising providing a memory unit operably coupled to the processing unit, the timing unit and the comparing unit, the method further comprising:

storing the operating clock frequency of the timing unit in the memory unit; and, storing acceleration threshold of the comparing unit in the memory unit.

10. The method of claim 9 wherein the memory unit is further operably coupled to the acceleration measuring unit and the method further comprises storing acceleration measurement information of the acceleration measuring unit in the memory unit.

11. The method of claim 8 wherein the pressure measuring unit is further operably coupled to the comparing unit; the method further comprising:

causing the comparing unit to generate a second trigger signal when the acceleration value is greater than the acceleration threshold and to direct the second trigger signal to the pressure measuring unit;

causing the pressure measuring unit to further be activated responsive to the second trigger signal; and, generate a third trigger signal when the pressure measurement has been completed and to direct the third trigger signal to the processing unit;

and, wherein:

in response to the third trigger signal being directed to the processing unit, the comparing unit no longer transmits the first trigger signal; and, the processing unit is further caused to enter the first mode responsive to the third trigger signal.

12. The method of claim 8, further comprising:

causing the processing unit to set a wake-up frequency of the timing unit, causing the timing unit to wake up the processing unit at the rate of the wake-up frequency, and:

causing the processing unit to further:

enter the second operating mode when the wake-up frequency has been set; and, enter the first operating mode while being woken-up by the timing unit.

\* \* \* \* \*